United States Patent [19]
Guy

[11] 3,901,266
[45] Aug. 26, 1975

[54] PRESSURE CONTROL VALVES

[75] Inventor: Kenneth Theodore Guy, Ruislip, England

[73] Assignee: Joseph Lucas (Industries) Limited, Birmingham, England

[22] Filed: Aug. 17, 1973

[21] Appl. No.: 389,222

[30] Foreign Application Priority Data
Aug. 17, 1972 United Kingdom............... 38327/72

[52] U.S. Cl................................. 137/219; 137/219
[51] Int. Cl.²........................................ F16K 31/163
[58] Field of Search........................... 137/219–222, 137/269; 251/138

[56] References Cited
UNITED STATES PATENTS

| | | |
|---|---|---|
| 1,520,117 | 12/1924 | Buehle ............................ 137/219 |
| 2,904,060 | 9/1959 | Fausek et al.................... 251/357 X |
| 2,919,714 | 1/1960 | Mrazek............................ 137/220 |
| 3,143,131 | 8/1964 | Spencer........................... 137/269 |
| 3,303,854 | 2/1967 | Churchill...................... 137/625.65 |
| 3,533,434 | 10/1970 | Smith............................. 137/220 |

Primary Examiner—Henry T. Klinksiek
Attorney, Agent, or Firm—Holman & Stern

[57] ABSTRACT

A fluid flow control is provided with a piston member slidable to control flow between an inlet and outlet. The position of the piston is determined by the pressure in a chamber and this is controlled by a valve member, the position of which is responsive to the pressure in the chamber and also to the level of electric current flowing in an electromagnetic device.

9 Claims, 5 Drawing Figures

PRESSURE CONTROL VALVES

BACKGROUND OF THE INVENTION

This invention relates to fluid flow controlling valves and has for its object to provide such a valve in a simple and convenient form.

SUMMARY OF THE INVENTION

A fluid flow controlling valve in accordance with the invention comprises in combination, a valve body, a valve chamber defined in the body, an inlet and an outlet communicating with the valve chamber, a valve housing defined in the valve chamber, said housing being of cup shaped form with its open end directed towards said outlet, a piston slidable within the housing, said piston having a skirt portion extending into said outlet, an aperture formed in said skirt portion, said aperture being exposed beyond said housing to permit flow of fluid between the inlet and outlet as the piston is moved towards the outlet, a chamber defined by the piston head and the housing and means for controlling the pressure in said chamber whereby the pressure in said outlet can be controlled, said controlling means comprising a valve control surface co-operating with a seating to determine the fluid pressure in the chamber, a further surface which is exposed to the pressure within said chamber, resilient means for opposing movement of the part upon which the further surface is formed due to the force created by the fluid pressure acting on said further surface, the movement of said part determining the relative setting of said control surface and the seating and electromagnetic means for influencing the relative setting of the control surface and the seating.

Examples of fluid flow controlling valves in accordance with the invention will now be described with reference to the accompanying drawings in which:

DETAILED DESCRIPTION OF THE EMBODIMENTS

Figure 1:
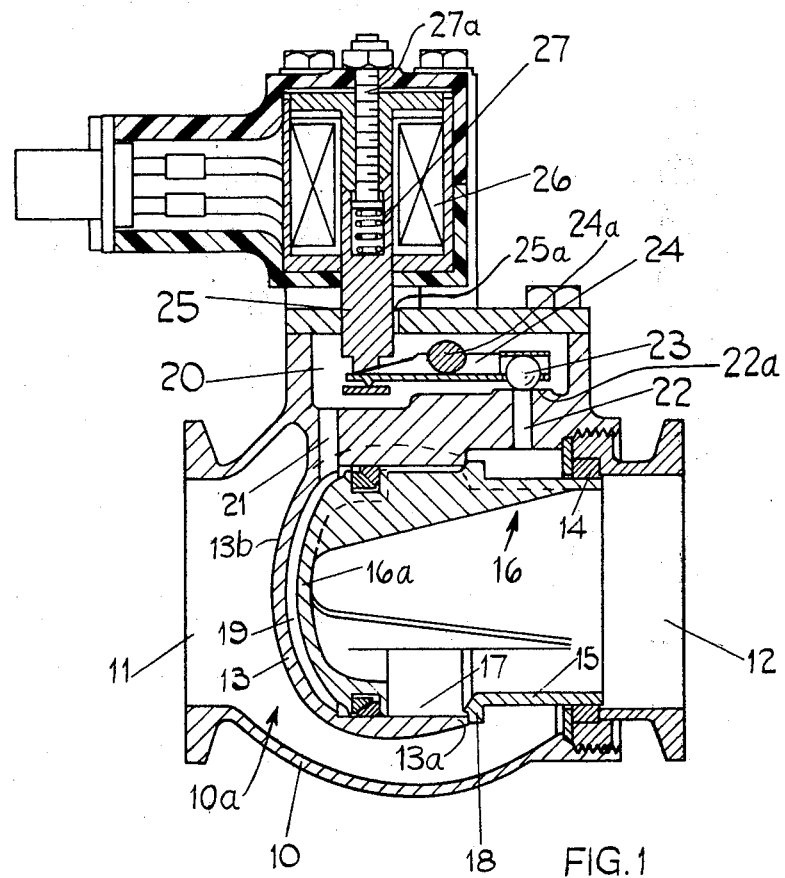
FIG. 1 shows in sectional side elevation one example of a valve in accordance with the invention.

Referring to FIG. 1 of the drawings, there is provided a valve body 10 having a flow inlet 11 and a flow outlet 12 connected to a valve chamber 10a within the body. Located within the valve chamber is a valve housing 13 which is of cup shaped form having its open end 13a directed towards the outlet 12. Mounted within the outlet is a combined seal and piston guide 14 which guides the movement of a skirt portion 15 of a piston 16, and head 16a of the piston is slidable within the cylinder defined by the internal surface of the valve housing.

The skirt portion 15 of the piston defines a plurality of apertures 17 about its periphery and in the closed position of the valve element constituted by the piston and skirt, as shown in FIG. 1, the apertures 17 are covered by the wall of the valve housing. In the open position of the valve element, the apertures 17 are exposed beyond the wall of the valve housing and fluid flow can take place between the inlet 11 and the outlet 12. It will be noted that an annular lip 18 is provided on the skirt portion 15 and this lip in the closed position of the valve element co-operates with an end surface 13a of the wall of the valve housing to define a fluid seal.

In order to move the valve element to the open position fluid under pressure is supplied to a second chamber 19 which is defined between a base wall 13b of the housing and the head 16a of the piston 16. The valve element is moved to the closed position by placing the second chamber 19 in communication with the atmosphere, and this allows the fluid pressure at the outlet to move the valve element to the position shown. The valve element is maintained in the closed position even when no fluid pressure exists at the outlet, by the action of inlet fluid pressure acting on a portion of the lip 18 with it being noted that the external diameter of the skirt portion is slightly less than the internal diameter of the valve housing so as to provide an annular area of the lip which is not pressure balanced in the closed position of the valve element. It will be appreciated that the pressure of fluid in the inlet acting on the lip also assists the closure of the valve element.

Also provided is a pressure control valve which includes a third chamber 20 defined in an extension of the valve body 10. The interior of the chamber 20 communicates with the third chamber 19 by way of a passage 21 and also leading into the chamber 20 is an inlet passage 22. This latter passage is in communication with the inlet 11 and at its end opening into the chamber 20 defines a seating 22a for a valve member in the form of a ball 23.

The ball 23 is located at one end of a beam 24 pivoted at 24a and the other end of the beam is connected to a piston in the form of an armature 25 of a solenoid 26. The armature extends through the wall of the chamber 20 and is loaded towards the chamber by means of a coiled compression spring 27 which acts intermediate an adjustable abutment 27a and the armature.

When the solenoid is energized the armature moves against the action of the spring 27 and the beam is tilted to force the ball 23 onto the seating 22a. As a result, no fluid is supplied to the chamber 20 and the pressure within the chamber 20 is equal to atmospheric pressure because of leakage from the chamber for instance past the armature through a clearance 25a. If there is no fluid pressure at the inlet 11, then the valve element constituted by the piston 16 and skirt 15 will assume a random position, but if there is fluid pressure at the inlet or the outlet then the valve element will assume the closed position as previously explained.

When the solenoid is de-energized fluid under pressure flows through the inlet passage 22 into the two chambers 19, 20 and the valve element, under the action of the pressure in the chamber 19, moves to the open position to permit fluid flow between the inlet and outlet.

The valve element constitutes a regulating member to control the pressure at the outlet 12 and a given pressure in the chamber 19 will result in a particular pressure at the outlet, with the valve element moving to maintain so far as possible, the outlet pressure substantially constant irrespective of variations in the inlet pressure and variation in the fluid flow through the valve.

The pressure in the chambers 19 and 20 is controlled by the combination of ball 23, beam 24, piston or armature 25 and spring 27. The fluid pressure at the inlet acting on the ball, supplemented by the force exerted by the spring, is balanced by the fluid pressure within the chamber 20 acting on the armature and the ball assumes a position removed from the seat to allow sufficient flow of fluid into the chamber 20 to balance the leakage from the chamber through the clearance 25a and to maintain a predetermined pressure within the chamber. The pressure in the chambers 19, 20 varies as the pressure at the inlet 11 varies to maintain a substantially constant pressure at the outlet 12 of the valve.

It will be seen that the abutment 27a for the spring 27 is adjustable so that the valve can be correctly adjusted to provide the desired pressure. Moreover, it will be appreciated that current may be caused to flow in the solenoid 26 to vary the forces acting on the beam to enable a different or different outlet pressures to be selected. Furthermore, the pivot 24a of the beam 24 determines the lever ratio between the armature and the ball 23 and therefore it in part determines the relationship between the outlet pressure and inlet pressure of the valve.

Figure 2:
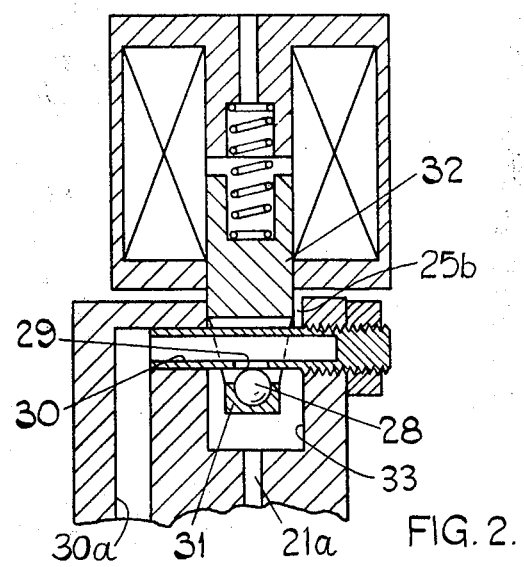
FIG. 2 shows a modification to the valve of FIG. 1.

In the alternative arrangement shown in FIG. 2, a ball 28 controls the effective size of a port 29 formed in the wall of an inlet tube 30 having one closed end and having its open end in communication as at 30a with the inlet 11 of the valve. The ball is mounted in a cradle 31 which extends around the inlet tube and which is connected to a spring loaded piston constituted by an armature 32 of the solenoid. The air flowing from the port 29 flows into a chamber 33 from which extends a passage 21a communicating with the chamber 19 of the valve. As in the previous examples, the piston constituted by the armature 32 is subjected to the pressure within the chamber 33, and as in the previous examples, the current flowing in the solenoid may be adjusted to provide a different outlet pressure or pressures. Moreover, leakage of air from the chamber 33 can take place through clearance 25b.

Figure 3:
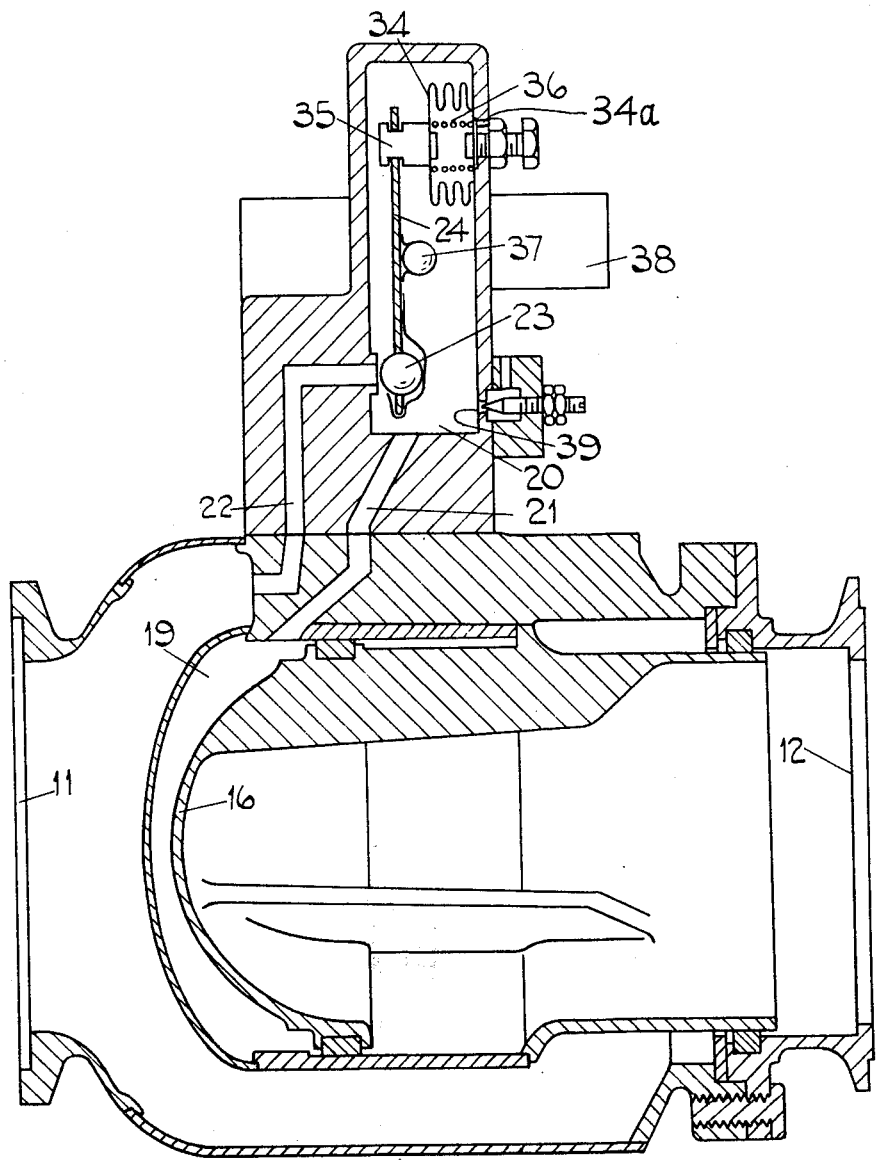
FIG. 3 shows another form of valve in accordance with the invention.

Turning now to FIG. 3, there is shown a modification in which identical reference numerals are used whenever possible to those which are used in FIG. 1. In this arrangement, the piston or armature 25 is replaced by a bellows unit 34 which supports an abutment 35 engaging the beam 24. The interior of the bellows is open to atmosphere through a port 34a. The bellows unit accommodates a spring 36 which is the equivalent of the spring 27 and the force exerted by the spring can be adjusted from the exterior of the housing.

The beam is carried upon a pivotal shaft 37 which forms the output shaft of an electromagnetic torque motor 38. The electric current flowing in the torque motor may be adjusted to provide the on-off facility obtained with the arrangements shown in FIGS. 1 and 2 and also to enable differing outlet pressures to be obtained. It will be noted that an adjustable orifice 39 is provided to enable air or other gas to leak from the chamber 20. This is because the bellows unit 34 does not permit leakage from the chamber 20 as does the piston 25 in FIG. 1.

Figure 4:
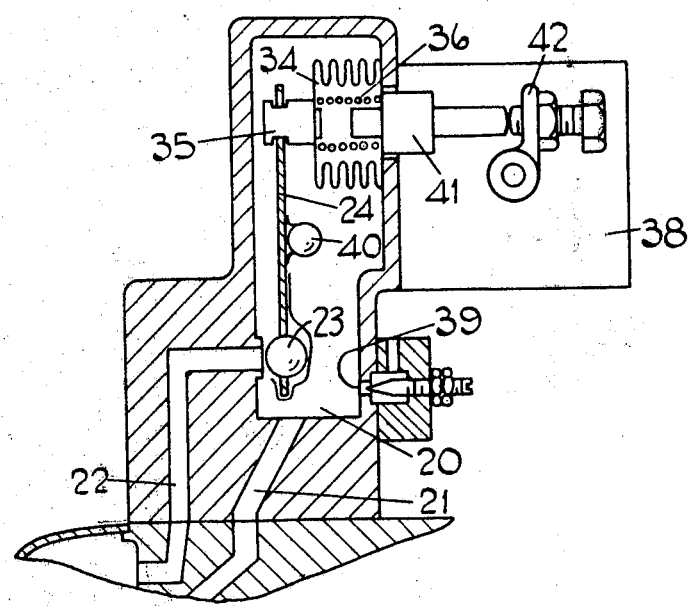
FIG. 4 shows a modification of a portion of the valve of FIG. 3.

The arrangement shown in FIG. 4 is a modification of the arrangement shown in FIG. 3. In this arrangement the beam 24 is mounted upon a plain pivot 40 and the torque motor 38 adjusts the force exerted by the spring 36. For this purpose, a slidable abutment 41 is provided for the spring and the position of the abutment is determined by a lever 42 carried on the output shaft of the torque motor 38.

Figure 5:
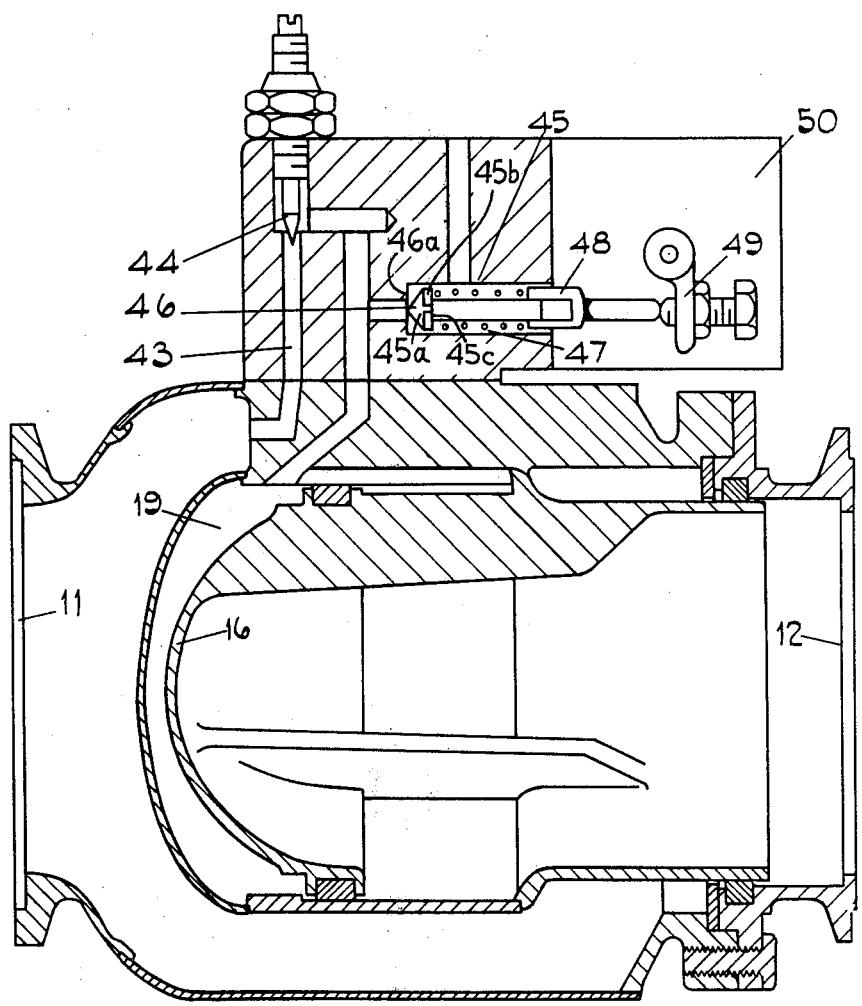
FIG. 5 is a sectional side elevation of another example of a valve in accordance with the invention.

A further arrangement is seen in FIG. 5. In this arrangement, an inlet passage 43 communicating with the inlet 11 of the valve contains an adjustable restrictor 44. The passage 43 communicates with the chamber 19 of the valve and for controlling the pressure within the passage downstream of the restrictor 44 and hence the pressure in the chamber 19, there is provided an adjustable relief valve 45. This relief valve comprises a valve member 46 which is loaded onto a seating 46a communicating with the inlet passage 43 downstream of the restrictor 44, by means of a coiled compression spring 47. The valve member has a stem slidable in a spring abutment 48 and the axial position of the abutment is controlled by a lever 49 carried upon the output shaft of a torque motor 50.

It will be seen that the valve 45 is provided with a conical cord 45a, an annulus 45b and a portion 45c radially inward of the annulus. In the closed position of the valve, the annulus 45b coacts with the seating 46a. The annulus constitutes the valve control means and the portion radially inward of the annulus the second means.

In operation, as the pressure in the inlet passage increases, the force acting to move the valve member away from the seating against the action of the spring 47 will also increase. As a result, an increase in the flow of fluid from the passage 43 downstream of the restrictor 44 will take place and the pressure in the chamber 19 will be controlled. As in the arrangement described with reference to FIG. 4, there is no on-off facility but the pressure at the outlet 12 can be controlled by varying the electric current flowing in the windings of the torque motor.

In the claims, the notation "valve control surface" has reference to the ball 23 (FIG. 1), ball 28 (FIG. 2), ball 23 (FIG. 3), ball 23 (FIG. 4) and the annulus 45b (FIG. 5). The notation "second surface" has reference to the piston 25 (FIG. 1), piston 32 (FIG. 2), abutment 35 (FIG. 3), abutment 35 (FIG. 4), and portion 45c (FIG. 5).

I claim:

1. A fluid flow controlling valve comprising, in combination, a valve body, a first chamber defined in the body, said body having an inlet and an outlet communicating with the first chamber, a valve housing provided in the first chamber, said housing being of cup shaped form having a closed end and an open end, said open end being directed towards said outlet, a piston slidable within the housing, said piston having a head and a skirt portion, said skirt portion extending into said outlet, said skirt portion having an aperture with the aperture being exposed beyond said valve housing to permit flow of fluid between the inlet and outlet as the piston is moved towards the outlet, a second chamber defined by the piston head and the closed end of the housing, and means for controlling the pressure in said second chamber whereby the pressure in said outlet can be controlled, said controlling means comprising a seating in communication with the inlet, a valve control surface co-operating with the seating to determine the fluid pressure in the second chamber, a movable part, said part having a second surface which is exposed to the pressure within said second chamber, resilient means for opposing movement of the movable part due to the force created by the fluid pressure acting on said second surface, the movement of said part determining the relative setting of said valve control surface and the seating, and electromagnetic means for influencing the relative setting of the valve control surface and the seating.

2. The valve as claimed in claim 1 in which said valve control surface and said second surface are both provided on said movable part, said part comprising a valve member, resilient means urging the valve member towards said seating, the force exerted on said valve member being adjustable by said electromagnetic means, the valve member when moved away from the seating allowing fluid from a passage connecting the inlet of the valve with said second chamber, said passage including a restrictor upstream of said seating.

3. The valve as claimed in claim 2 in which a torque motor constitutes said electromagnetic means, said torque motor having an output shaft, a movable abutment for the resilient means, and a lever operatively connected to a movable abutment, said lever being mounted on the output shaft.

4. The valve as claimed in claim 1 including a third chamber, said seating being formed about the end of a passage opening into said third chamber, said passage communicating with the inlet of the valve, the interior of said third chamber communicating with said first chamber, a pivotal beam in said third chamber, said valve control surface being a valve member carried by one end of the beam, said movable part being connected to the other end of the beam, the arrangement being such that the fluid pressure within the third chamber acts on the second surface defined by said movable part to close the valve member onto the seating.

5. The valve as claimed in claim 4 in which said movable part is in the form of a piston providing an armature of a solenoid.

6. The valve as claimed in claim 4 in which said movable part comprises a diaphragm or bellows unit.

7. The valve as claimed in claim 6 including a torque motor having an output shaft, and the beam being mounted for pivotal movement upon the output shaft of the torque motor.

8. The valve as claimed in claim 6 including a torque motor, said resilient means comprising a coiled compression spring, with the force exerted by said spring being adjustable by the torque motor.

9. The valve as claimed in claim 1 in which said movable part is in the form of a piston constituting an armature of a solenoid, said armature defining a cradle, and a valve member defining said valve control surface supported by the cradle.

* * * * *